US011913588B2

(12) United States Patent
Tjader

(10) Patent No.: US 11,913,588 B2
(45) Date of Patent: *Feb. 27, 2024

(54) PORTABLE WINCH

(71) Applicant: TT Technologies, Inc., Aurora, IL (US)

(72) Inventor: Michael Tjader, New Richmond, WI (US)

(73) Assignee: TT Technologies, Inc., Aurora, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/896,722

(22) Filed: Aug. 26, 2022

(65) Prior Publication Data

US 2023/0100802 A1    Mar. 30, 2023

Related U.S. Application Data

(60) Continuation of application No. 17/107,179, filed on Nov. 30, 2020, now Pat. No. 11,441,722, which is a
(Continued)

(51) Int. Cl.
*F16L 55/18* (2006.01)
*B66C 23/66* (2006.01)
(Continued)

(52) U.S. Cl.
CPC .............. *F16L 55/18* (2013.01); *B66C 23/66* (2013.01); *B66C 23/70* (2013.01); *B66D 1/36* (2013.01);
(Continued)

(58) Field of Classification Search
CPC ..... F16L 55/18; F16L 55/165; F16L 55/1658; F16L 55/30; F16L 2101/50; B66D 1/60;
(Continued)

(56) References Cited

U.S. PATENT DOCUMENTS 2,297,164 A    9/1942   Rainwater
2,491,357 A   12/1949   Ashton
(Continued)

FOREIGN PATENT DOCUMENTS

CN    1238301 A    12/1999
CN  111689407 A     9/2020
(Continued)

OTHER PUBLICATIONS

"U.S. Appl. No. 11/747,386, Non Final Office Action dated Oct. 15, 2009", 6 pgs.
(Continued)

*Primary Examiner* — Frederick L Lagman
(74) *Attorney, Agent, or Firm* — Schwegman Lundberg & Woessner, P.A.

(57) ABSTRACT

A portable winch and method of use is shown. One advantage of winches shown includes an ability to lower a boom or boom sections into limited access exit pit for winching operations such as pipe bursting. Sectional boom designs shown provide the ability to easily raise and lower a boom large distances without the need for a single long boom. Selected winch designs shown include flexible inserts between the boom and the winch frame that help resist damage from unforeseen shifting of the device during operation. Designs and methods shown also include multiple pulleys on a boom end unit. Fasteners are shown that reduce build up of debris.

14 Claims, 12 Drawing Sheets

Related U.S. Application Data continuation of application No. 16/426,925, filed on May 30, 2019, now Pat. No. 10,865,081, which is a continuation of application No. 15/671,553, filed on Aug. 8, 2017, now Pat. No. 10,322,917, which is a continuation of application No. 14/557,115, filed on Dec. 1, 2014, now Pat. No. 9,731,944, which is a continuation of application No. 13/686,617, filed on Nov. 27, 2012, now Pat. No. 8,899,878, which is a continuation of application No. 13/333,962, filed on Dec. 21, 2011, now Pat. No. 8,317,427, which is a division of application No. 12/835,949, filed on Jul. 14, 2010, now Pat. No. 8,083,213, which is a division of application No. 11/747,386, filed on May 11, 2007, now Pat. No. 7,770,869.

(60) Provisional application No. 60/823,458, filed on Aug. 24, 2006, provisional application No. 60/747,590, filed on May 18, 2006.

(51) Int. Cl.
*B66C 23/70* (2006.01)
*B66D 1/36* (2006.01)
*B66D 1/38* (2006.01)
*B66D 1/74* (2006.01)
*B66D 3/04* (2006.01)
*B66D 3/06* (2006.01)
*E21B 7/30* (2006.01)
*E21B 19/084* (2006.01)
*F16L 55/165* (2006.01)
*F16L 101/50* (2006.01)

(52) U.S. Cl.
CPC ............ *B66D 1/38* (2013.01); *B66D 1/74* (2013.01); *B66D 3/04* (2013.01); *B66D 3/06* (2013.01); *E21B 7/30* (2013.01); *E21B 19/084* (2013.01); *F16L 55/1658* (2013.01); *F16L 2101/50* (2013.01)

(58) Field of Classification Search
CPC ... B66D 3/04; B66D 3/06; B66D 3/08; B66D 2700/026
See application file for complete search history.

(56) References Cited

U.S. PATENT DOCUMENTS

| | | | |
|---|---|---|---|
| 2,625,275 A | 1/1953 | Ashton | |
| 2,740,537 A | 4/1956 | Johnston | |
| 3,244,292 A | 4/1966 | Elliott | |
| 3,469,712 A | 9/1969 | Haulotte | |
| 3,643,365 A | 2/1972 | Demmert | |
| 3,889,818 A | 6/1975 | Wennerstrom | |
| 3,987,746 A | 10/1976 | McCulloh | |
| 4,013,270 A | 3/1977 | Laky et al. | |
| 4,507,019 A | 3/1985 | Thompson | |
| 4,512,436 A | 4/1985 | Freudenthal et al. | |
| 4,590,720 A | 5/1986 | Reed | |
| 5,192,165 A * | 3/1993 | Torielli | E21B 7/30 405/184 |
| 5,211,297 A | 5/1993 | Vandervalk | |
| 5,211,509 A * | 5/1993 | Roessler | F16L 1/065 405/184 |
| 5,240,229 A | 8/1993 | Timmons | |
| 5,267,824 A | 12/1993 | Kishi | |
| 5,328,297 A * | 7/1994 | Handford | E02F 5/10 405/184 |
| 5,626,442 A * | 5/1997 | Boyer | B08B 9/0436 405/184.2 |
| 5,820,455 A | 10/1998 | Breedlove | |
| 5,913,639 A | 6/1999 | Ellis | |
| 5,918,861 A | 7/1999 | Parker | |
| 6,039,508 A | 3/2000 | White | |
| 6,202,868 B1 | 3/2001 | Murray | |
| 6,234,453 B1 | 5/2001 | Block | |
| 6,443,657 B1 | 9/2002 | Brahler | |
| 6,491,174 B1 | 12/2002 | Day | |
| 6,494,437 B1 * | 12/2002 | Boyer | E02F 3/963 254/323 |
| 6,672,802 B2 * | 1/2004 | Putnam | B66D 3/006 405/184 |
| 6,705,821 B2 | 3/2004 | Phillips et al. | |
| 6,769,669 B2 | 8/2004 | Cook et al. | |
| 6,830,409 B2 | 12/2004 | Carlson | |
| 7,011,123 B2 | 3/2006 | Peterson | |
| 7,025,536 B2 | 4/2006 | Putnam | |
| 7,048,257 B2 | 5/2006 | Wentworth et al. | |
| 7,306,548 B2 | 12/2007 | Martin et al. | |
| 7,341,404 B2 | 3/2008 | Tjader | |
| 7,357,376 B2 | 4/2008 | Assmann | |
| 7,588,232 B2 | 9/2009 | Wei et al. | |
| 7,712,726 B1 | 5/2010 | Jernigan | |
| 7,770,869 B2 * | 8/2010 | Tjader | B66D 3/04 212/348 |
| 8,083,213 B2 * | 12/2011 | Tjader | E21B 19/084 254/338 |
| 8,317,427 B2 * | 11/2012 | Tjader | E21B 19/084 405/184.3 |
| 8,899,878 B2 * | 12/2014 | Tjader | B66C 23/70 254/338 |
| 9,261,220 B2 | 2/2016 | Tjader | |
| 9,731,944 B2 * | 8/2017 | Tjader | B66C 23/66 |
| 10,322,917 B2 * | 6/2019 | Tjader | B66D 1/74 |
| 10,865,081 B2 * | 12/2020 | Tjader | B66D 1/38 |
| 11,441,722 B2 * | 9/2022 | Tjader | B66D 3/04 |
| 2003/0039531 A1 | 2/2003 | Bickle | |
| 2005/0062030 A1 * | 3/2005 | Wentworth | E21B 19/084 254/323 |
| 2005/0133114 A1 | 6/2005 | Peterson | |
| 2006/0056919 A1 * | 3/2006 | Tjader | F16L 55/1658 405/184.3 |
| 2006/0086008 A1 | 4/2006 | Hubscher et al. | |
| 2006/0276311 A1 | 12/2006 | Martin et al. | |
| 2007/0221600 A1 | 9/2007 | Davis | |
| 2008/0069644 A1 | 3/2008 | Tjader | |
| 2008/0182624 A1 | 7/2008 | Newman | |
| 2010/0270522 A1 | 10/2010 | Tjader | |
| 2011/0192390 A1 | 8/2011 | Johnson | |
| 2011/0206488 A1 | 8/2011 | Windsor et al. | |
| 2012/0093586 A1 | 4/2012 | Tjader | |
| 2013/0026431 A1 | 1/2013 | Uemura et al. | |
| 2013/0082224 A1 | 4/2013 | Tjader | |
| 2015/0083984 A1 | 3/2015 | Tjader | |
| 2016/0137468 A1 | 5/2016 | Walker | |
| 2016/0169413 A1 | 6/2016 | Camacho et al. | |
| 2016/0207744 A1 | 7/2016 | Uemura et al. | |
| 2017/0334688 A1 | 11/2017 | Tjader | |
| 2019/0276283 A1 | 9/2019 | Tjader | |
| 2021/0078841 A1 | 3/2021 | Tjader | |

FOREIGN PATENT DOCUMENTS

| | | | |
|---|---|---|---|
| EP | 0870971 A1 | 10/1998 | |
| EP | 943579 A2 * | 9/1999 | ............ B66C 23/66 |
| EP | 1634848 A2 | 3/2006 | |
| EP | 1857402 B1 | 12/2016 | |
| GB | 1483850 | 8/1977 | |

OTHER PUBLICATIONS

"U.S. Appl. No. 11/747,386, Notice of Allowance dated Apr. 6, 2010", 4 pgs.
"U.S. Appl. No. 11/747,386, Response filed Jan. 12, 2010 to Non Final Office Action dated Oct. 15, 2009", 7 pgs.
"U.S. Appl. No. 11/747,386, Response filed Sep. 18, 2009 to Restriction Requirement dated Aug. 21, 2009", 10 pgs.
"U.S. Appl. No. 11/747,386, Restriction Requirement dated Aug. 21, 2009", 7 pgs.

(56) References Cited

OTHER PUBLICATIONS

"U.S. Appl. No. 12/835,949 Non-Final Office Action dated Sep. 16, 2010", 4 pgs.
"U.S. Appl. No. 12/835,949, Final Office Action dated May 17, 2011", 5 pgs.
"U.S. Appl. No. 12/835,949, Notice of Allowance dated Aug. 16, 2011", 5 pgs.
"U.S. Appl. No. 12/835,949, Response filed Feb. 16, 2011 to Non Final Office Action dated Sep. 16, 2010", 9 pgs.
"U.S. Appl. No. 12/835,949, Response filed Jul. 25, 2011 to Final Office Action dated May 17, 2011", 6 pgs.
"U.S. Appl. No. 13/333,962, Non Final Office Action dated Feb. 17, 2012", 6 pgs.
"U.S. Appl. No. 13/333,962, Notice of Allowance dated Jul. 23, 2012", 5 pgs.
"U.S. Appl. No. 13/333,962, Response filed May 17, 2012 to Non Final Office Action dated Feb. 17, 2012", 8 pgs.
"U.S. Appl. No. 13/686,617, Advisory Action dated Nov. 14, 2013", 3 pgs.
"U.S. Appl. No. 13/686,617, Final Office Action dated Aug. 26, 2013", 6 pgs.
"U.S. Appl. No. 13/686,617, Non Final Office Action dated Feb. 14, 2014", 5 pgs.
"U.S. Appl. No. 13/686,617, Non Final Office Action dated Mar. 15, 2013", 9 pgs.
"U.S. Appl. No. 13/686,617, Notice of Allowance dated Jul. 30, 2014", 5 pgs.
"U.S. Appl. No. 13/686,617, Response filed May 15, 2014 to Non Final Office Action dated Feb. 14, 2014", 7 pgs.
"U.S. Appl. No. 13/686,617, Response filed Jun. 17, 2013 to Non Final Office Action dated Mar. 15, 2013", 7 pgs.
"U.S. Appl. No. 13/686,617, Response filed Oct. 24, 2013 to Final Office Action dated Aug. 26, 2013", 8 pgs.
"U.S. Appl. No. 14/557,115, Final Office Action dated Oct. 7, 2016", 6 pgs.
"U.S. Appl. No. 14/557,115, Non Final Office Action dated May 31, 2016", 8 pgs.
"U.S. Appl. No. 14/557,115, Non Final Office Action dated Dec. 31, 2015", 9 pgs.
"U.S. Appl. No. 14/557,115, Notice of Allowance dated Apr. 12, 2017", 5 pgs.
"U.S. Appl. No. 14/557,115, Preliminary Amendment filed Dec. 18, 2014", 5 pgs.
"U.S. Appl. No. 14/557,115, Response filed Aug. 31, 2016 to Non-Final Office Action dated May 31, 2016", 7 pgs.
"U.S. Appl. No. 15/671,553, Advisory Action dated Dec. 5, 2018", 2 pgs.
"U.S. Appl. No. 15/671,553, Final Office Action dated Sep. 17, 2018", 11 pgs.
"U.S. Appl. No. 15/671,553, Non Final Office Action dated Feb. 22, 2018", 11 pgs.
"U.S. Appl. No. 15/671,553, Notice of Allowance dated Feb. 6, 2019", 5 pgs.
"U.S. Appl. No. 15/671,553, Preliminary Amendment filed Aug. 9, 2017", 5 pgs.
"U.S. Appl. No. 15/671,553, Response filed Jan. 17, 2019 to Advisory Action dated Dec. 5, 2018", 2 pgs.
"U.S. Appl. No. 15/671,553, Response filed Nov. 19, 2018 to Final Office Action dated Sep. 17, 2018", 7 pgs.
"U.S. Appl. No. 15/671,553, Response filwed Jun. 22, 2018 to Non-Final Office Action dated Feb. 22, 2018", 10 pgs.
"U.S. Appl. No. 16/426,925, Final Office Action dated May 20, 2020", 8 pgs.
"U.S. Appl. No. 16/426,925, Non Final Office Action dated Dec. 26, 2019", 8 pgs.
"U.S. Appl. No. 16/426,925, Notice of Allowance dated Aug. 13, 2020", 5 pgs.
"U.S. Appl. No. 16/426,925, Response filed Mar. 25, 2020 to Non Final Office Action dated Dec. 26, 2019", 9 pgs.
"U.S. Appl. No. 16/426,925, Response filed Jul. 20, 2020 to Final Office Action dated May 20, 2020", 8 pgs.
"U.S. Appl. No. 17/107,179, Final Office Action dated Feb. 22, 2022", 8 pgs.
"U.S. Appl. No. 17/107,179, Non Final Office Action dated Sep. 29, 2021", 10 pgs.
"U.S. Appl. No. 17/107,179, Notice of Allowance dated May 10, 2022", 8 pgs.
"U.S. Appl. No. 17/107,179, Response filed Apr. 20, 2022 to Final Office Action dated Feb. 22, 2022", 6 pgs.
"U.S. Appl. No. 17/107,179, Response filed Dec. 28, 2021 to Non Final Office Action dated Sep. 29, 2021", 8 pgs.
"U.S. Appl. No. 14/557,115, Response filed Mar. 30, 2016 to Non-Final Office Action dated Dec. 31, 2015", 9 pgs.
"European Application No. 07108308.3, Non Final Office Action dated Jun. 17, 2013", 5 pgs.
"European Application Serial No. 07108308.3, European Search Report dated Oct. 20, 2010", 7 pgs.
"European Application Serial No. 07108308.3, European Search Report Response Filed May 17, 2011", 2 pgs.
"European Application Serial No. 07108308.3, Examination Notification Art. 94(3) dated Oct. 24, 2014", 4 pgs.
"European Application Serial No. 07108308.3, Response filed Feb. 25, 2015", 68 pgs.
"European Application Serial No. 07108308.3, Response filed Oct. 14, 2013", 10 pgs.

* cited by examiner

```
┌─────────────────────────────────────────────────────┐
│  actuating a boom driver against a lateral surface of a first │
│  boom section to lower the first boom section into a first hole │
└─────────────────────────────────────────────────────┘
                          │
                          ▼
┌─────────────────────────────────────────────────────┐
│  positioning a pulley on a distal end of the first boom section │
│          adjacent to a pipe to be replaced          │
└─────────────────────────────────────────────────────┘
                          │
                          ▼
┌─────────────────────────────────────────────────────┐
│  running a flexible line from a winch located outside the first │
│  hole along the pulley and through the pipe to be replaced, the │
│           flexible line exiting in a second hole    │
└─────────────────────────────────────────────────────┘
                          │
                          ▼
┌─────────────────────────────────────────────────────┐
│   coupling a pipe burster to the flexible line in the second hole │
└─────────────────────────────────────────────────────┘
                          │
                          ▼
┌─────────────────────────────────────────────────────┐
│  pulling the pipe burster through the pipe to be replaced while │
│            pulling in a section of new pipe         │
└─────────────────────────────────────────────────────┘
```

Fig. 12

PORTABLE WINCH

PRIORITY APPLICATIONS

This patent application is a Continuation of U.S. application Ser. No. 17/107,179, filed Nov. 30, 2020, (issued as U.S. Pat. No. 11,441,722), which is a Continuation of U.S. application Ser. No. 16/426,925, filed May 30, 2019, (issued as U.S. Pat. No. 10,865,081), which is a Continuation of U.S. application Ser. No. 15/671,553, filed Aug. 8, 2017 (issued as U.S. Pat. No. 10,322,917), which is a Continuation of U.S. application Ser. No. 14/557,115, filed Dec. 1, 2014 (issued as U.S. Pat. No. 9,731,944), which is a Continuation of U.S. application Ser. No. 13/686,617, filed Nov. 27, 2012 (issued as U.S. Pat. No. 8,899,878), which is a Continuation of U.S. application Ser. No. 13/333,962, filed on Dec. 21, 2011 (issued as U.S. Pat. No. 8,317,427), which is a Divisional of U.S. application Ser. No. 12/835,949, filed on Jul. 14, 2010 (issued as U.S. Pat. No. 8,083,213), which is a Divisional of U.S. application Ser. No. 11/747,386, filed on May 11, 2007 (issued as U.S. Pat. No. 7,770,869), which claims the benefit of priority under 35 U.S.C. Section 119(e) to U.S. Provisional Patent Application Ser. No. 60/747,590, filed on May 18, 2006, and U.S. Provisional Patent Application Ser. No. 60/823,458, filed on Aug. 24, 2006, all of which are incorporated herein by reference in their entirety.

TECHNICAL FIELD

This invention relates to devices and methods for pulling a flexible line. Specifically, this invention relates to cable pulling devices, methods, and accessories for pipe replacement.

BACKGROUND

Winches with booms can be used for a number of applications. For example, in a pipe bursting operation, one method uses a cable, or wire rope to pull a pipe burster through a section of pipe to be replaced. A winch with a boom can be used in a manhole or other small hole to pull the cable and burst the pipe. Typically in such an operation, a new replacement pipe is pulled along behind the pipe burster to replace the old pipe. An advantage of this method of pipe bursting includes eliminating the need to dig up the old pipe using a trench. Another advantage of this method of pipe bursting includes the ability to replace the old pipe with a new pipe that is substantially the same diameter as the old pipe. Fragments or portions of the old pipe are merely pushed into the surrounding soil to make room for the replacement pipe.

One challenge with winches and pipe bursting includes the small spaces usually associated with the pulling end of the operation. For example, in a manhole, it may be difficult to assemble a boom for the winch, and to adjust the length of the boom. Further, during a winching operation, booms may shift due to partial collapse of the wall of the hole or other reasons. What is needed is an improved winch and boom system that provides ease of setup, and other improved design features that provide a robust device at an economical cost.

BRIEF DESCRIPTION OF THE DRAWINGS

FIG. 12 shows a flow diagram of a method of pipe bursting according to an embodiment of the invention.

DETAILED DESCRIPTION

Figure 1A:
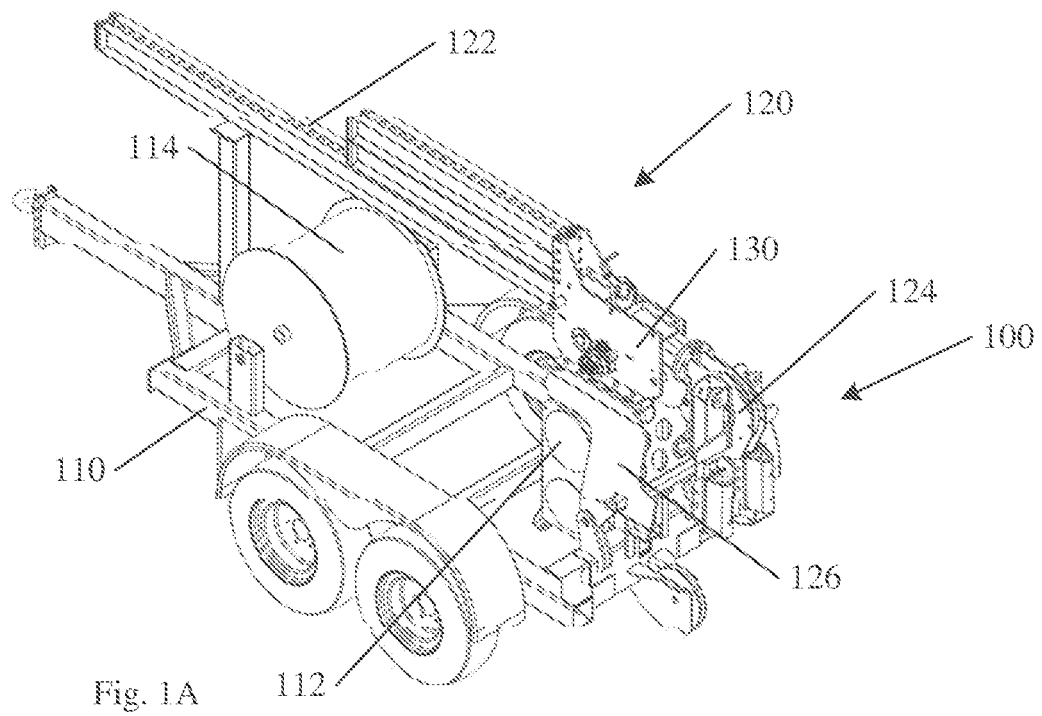
FIG. 1A shows an isometric view of a portable winch in a storage position according to an embodiment of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. In the following description, the term cable is defined to include metal cables, wire rope, or other lengths of flexible line of suitable strength to pull devices as described below through a section of pipe. These embodiments are described in sufficient detail to enable those skilled in the art to practice the invention. Other embodiments may be utilized and structural, or logical changes, etc. may be made without departing from the scope of the present invention.

FIG. 1A shows a portable winch 100 including a frame 110 and a boom assembly 120. In one embodiment, a drum 114 is included to hold an amount of flexible line such as wire rope, cable, etc. that the portable winch is designed to pull. In one embodiment, the drum 114 is a separate component from a winch. In the embodiment shown in FIG. 1A, a winch 112 is shown attached to the frame 110 adjacent to the boom assembly 120. In one embodiment, the winch includes a dual capstan winch. Other winch designs such as single drum winches, etc. are also within the scope of the invention. In one embodiment, the winch 112 is driven by hydraulic motors.

Figure 1B:
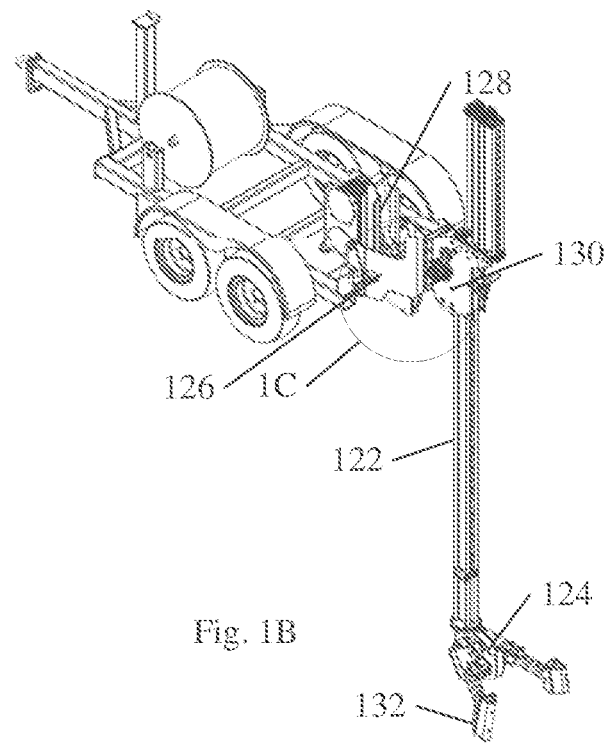
FIG. 1B shows an isometric view of a portable winch in an operational position according to an embodiment of the invention.

The boom assembly 120 as shown includes a boom section 122 and a boom end unit 124. In one embodiment, the boom assembly 120 includes a housing 130 with a boom driver and other devices that are explained in more detail below. In one embodiment, the housing 130 moves through use of a movable connection system 126. One embodiment shown in FIGS. 1A and 1B illustrates the movable connection system 126 as a combination of pivots and linkages driven by an actuator such as a hydraulic cylinder. Other embodiments include tracks and driving systems such as a toothed rack and a drive gear, etc. One advantage of linkage and pivot embodiments includes reduced manufacturing cost. In one embodiment, the boom end unit 124 includes a pulley as shown in FIG. 1A. Other devices for redirecting a flexible line are also within the scope of the invention, such as skid plates, tubes, rollers, etc.

The boom assembly 120 of FIG. 1A is shown in a storage position suitable for transportation of the portable winch 100. FIG. 1B shows the portable winch 100 of FIG. 1A with the boom assembly 120 in an operation position. The boom section 122 is oriented substantially vertically with respect to a ground surface with the boom section 122 extended and the boom end unit 124 located at an operational distance below ground level. In one embodiment, at least one support strut 132 is included adjacent to the boom end unit 124 as shown in FIG. 1B. One or more support struts 132 are used to hold the pulley of the boom end unit 124 away from a wall of a pit during a winching operation.

Figure 1C:
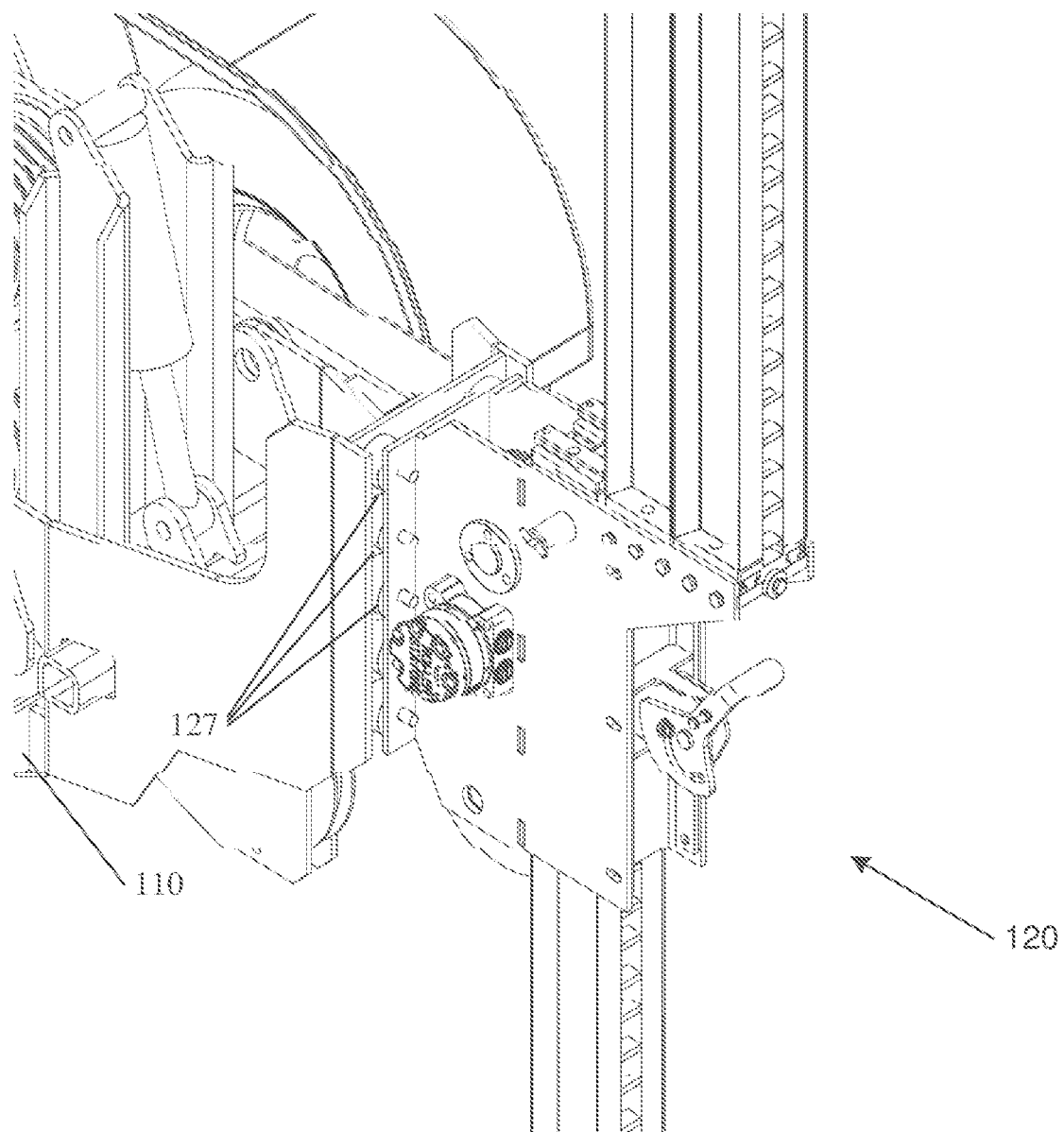
FIG. 1C shows a close up view of a portion of a portable winch from FIG. 1B according to an embodiment of the invention.

In one embodiment, the boom assembly 120 is flexibly connected to the frame 110 within a given range of motion. In a winching operation, it is possible to encounter shifts in the boom. Such shifts may be caused by partial collapse of a wall that a support strut 132 is placed against. Having the boom assembly 120 flexibly connected to the frame 110 provides a safety margin in the event that a boom shift occurs caused by a wall collapse or other reason. If the boom assembly 120 were solidly fixed to the frame 110, the boom may become bent or damaged due to such a shift. FIG. 1C show one embodiment of a flexible connection between the boom assembly 120 and the frame 110. In FIG. 1, the flexible connection is accomplished using one or more elastomeric inserts 127. The elastomeric inserts are bolted or otherwise fastened between a component of the winch assembly 120 and the frame 110.

An advantage of elastomeric inserts includes inexpensive manufacture, and a limited range of motion, making the boom assembly 120 somewhat rigid with respect to the frame 110, yet still remaining flexible enough to prevent damage to the boom, etc. in the event of a boom shift. Other flexible connections include, but are not limited to steel spring connections, compressed gas cylinder connections, etc. In one embodiment, the elastomeric inserts 127 are located between the movable connection system 126 and the frame. Other locations are also acceptable, provided the boom 122 is allowed a range of motion with respect to the frame 110.

Figure 2:
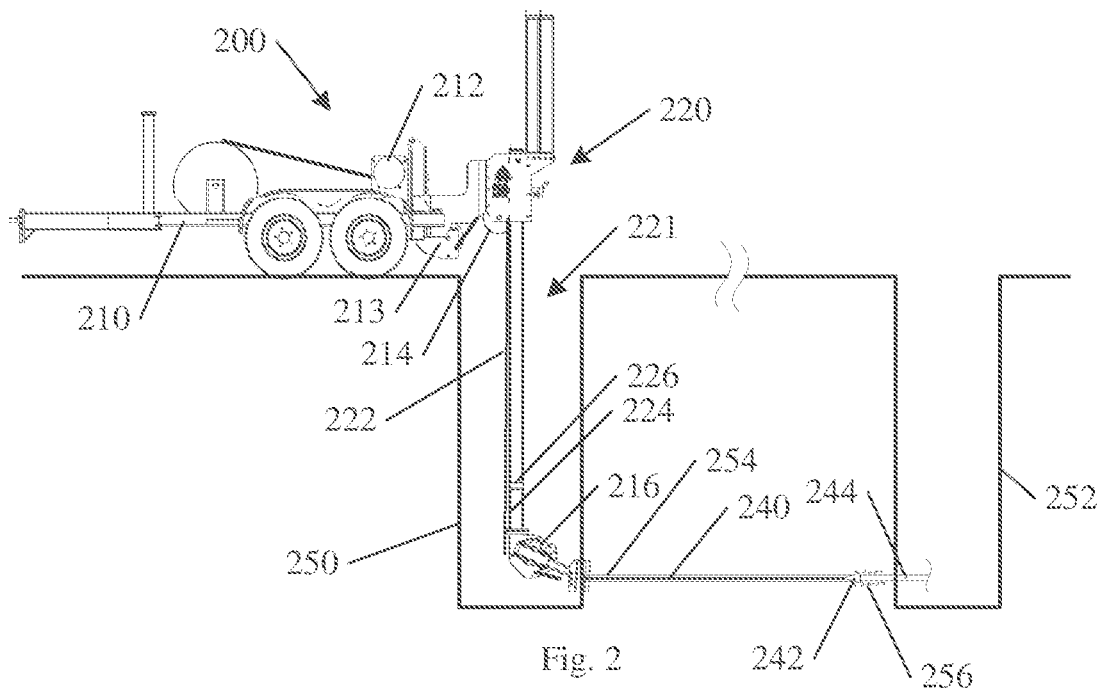
FIG. 2 shows a side view of a portable winch in pipe bursting operation according to an embodiment of the invention.

FIG. 2 shows an embodiment of a portable winch 200 similar to embodiments described above in one possible application, specifically a trenchless pipe bursting operation. The portable winch includes a frame 210 with a boom assembly 220 attached to the frame 210. A first hole 250 and a second hole 252 are illustrated. In one embodiment, the first and second holes 250, 252 include manholes. A first pipe 254 is shown that is to be replaced in the pipe bursting operation. In one method of operation, a flexible line 240 such as a wire rope begins at a winch 212, and travels across a first pulley 213, then back over a second pulley 214, then down along a boom 221. By pulling over multiple pulleys in the configuration shown in FIG. 2 a tension generated in the flexible line 240 tends to pull the boom assembly 220 down against the frame 210 where the first pulley 213 is attached. In such a configuration, the frame 210 takes the force of a pulling operation, in contrast to the connection system such as connection system 126 shown in embodiments described above. As a result the connection system does not need to withstand the full pulling force of the flexible line 240, and can be designed more economically. Although the configuration described above includes such advantages, the invention is not so limited. Other pulley systems and connection systems can be used within the scope of the invention.

In one embodiment, the boom 221 includes multiple sections. As shown in FIG. 2, for example, an end unit 224 is coupled to a boom section 222 to form the boom 221. A coupling 226 is located between the end unit 224 and the boom section 222. Details of coupling designs are discussed in more detail below.

In one embodiment, the position of the second pulley 214 locates the flexible line 240 within a cross section of the boom 221. An advantage of location within a cross section of the boom 221 includes keeping boom forces in compression during a winching operation, thus reducing the possibility of buckling the boom 221 or a boom section. The flexible line 240 then continues over a third pulley 216, and is redirected into the first pipe 254 from an end located in the first hole 250 to an end located at the second hole 252. A pipe bursting head 242 is then coupled to the distal end of the flexible line 240. In selected embodiments, a pipe bursting head 242 includes an expander, pipe cutter, pipe breaker, etc.

The winch 212 then pulls the pipe bursting head 242 through the first pipe 254 to burst or split the first pipe 254 into the surrounding soil. Fragments of bursted pipe 256 are shown in FIG. 2. In one embodiment, a second pipe 244 is also attached to the pipe bursting head 242 and is pulled into place as the first pipe 254 is burst. Although pipe bursting is illustrated as one application of a portable winch, other operations are also within the scope of the invention. Ductile pipe splitting, pipe lining, or other pipe repair and replacement operations are also within the scope of the invention.

Figure 3:
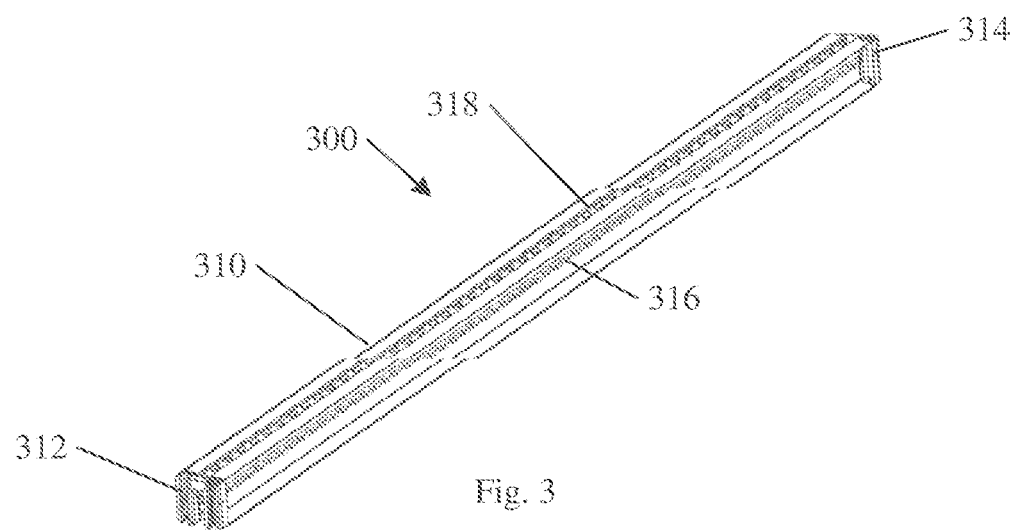
FIG. 3 shows an isometric view of a boom section according to an embodiment of the invention.

FIG. 3 shows a boom section 300 according to an embodiment of the invention. In one embodiment, the boom section 300 is similar to boom sections discussed above. A boom body 310 is shown with a first end 312 and a second end 314. In one embodiment, an engaging feature or features 316 are included on a lateral side of the body 310. In one embodiment, a number of spaced structures 318 are located on another lateral side of the body 310. In one embodiment, the spaced structures 318 are located on a side opposite the engaging feature or features 316.

In one embodiment, the engaging features 316 include a toothed rack to engage with a drive gear. In one embodiment, the engaging features include a frictional surface to engage a tire or a wheel, etc. In one embodiment, the first end 312 is shaped to engage a second end 314 of another boom section similar to the boom section 300. In one embodiment, the first end 312 uniquely engages a second end 314 of another boom section. In one embodiment, the first end 312 is adapted to engage either a first end 312 or a second end 314 of another boom section. In one embodiment, other sections such as an end unit 224 as described above include an end that is adapted to engage either a first end 312 or a second end 314 of a boom section 300.

Figure 4:
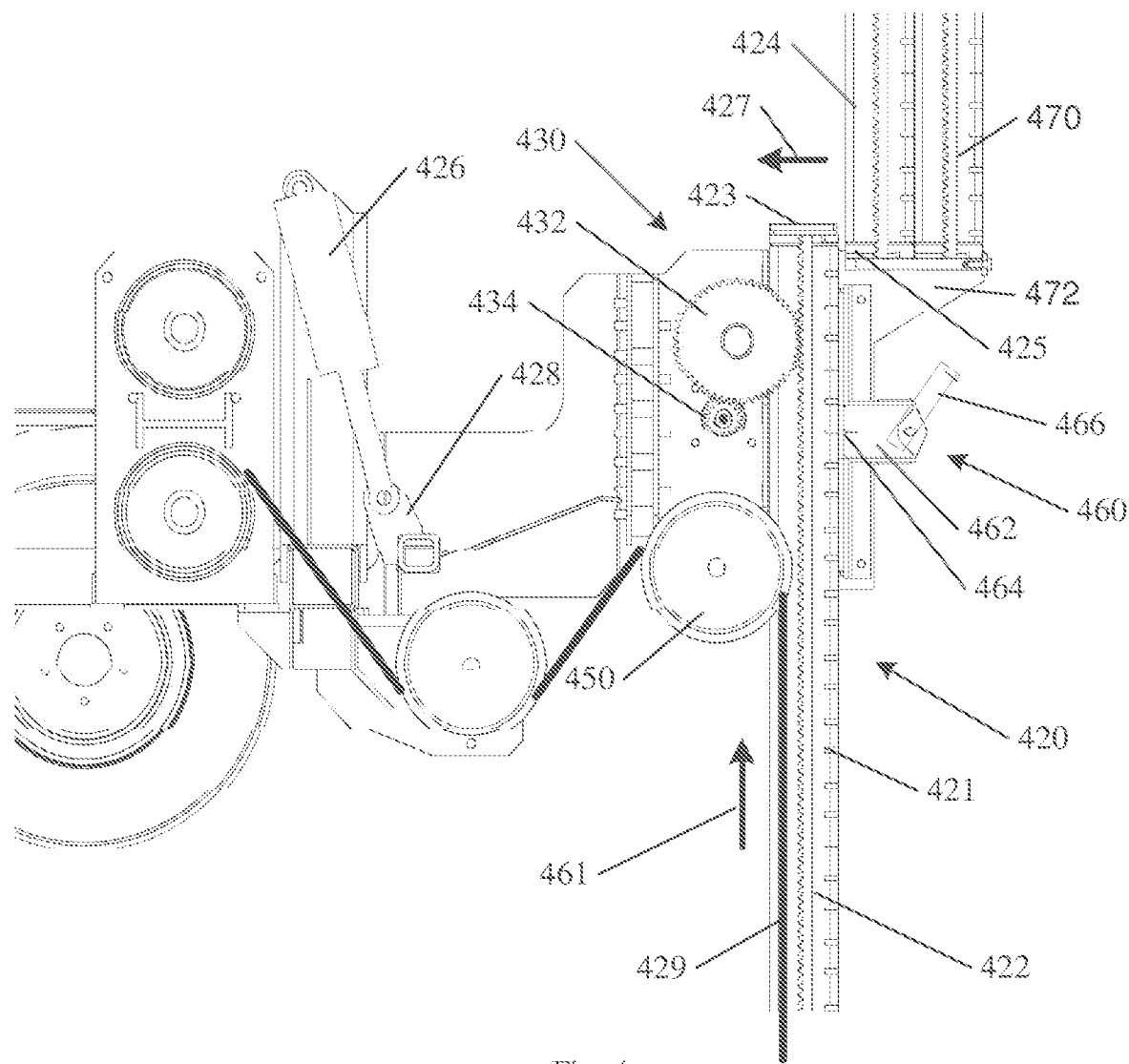
FIG. 4 shows a cross section view of a portion of a boom system according to an embodiment of the invention.

FIG. 4 shows a close up view of a portion of a boom assembly 420 similar to embodiments described above. A first boom section 422 is shown with a second boom section 424 ready to add to a total length of a boom. An engaging feature 423 is shown located on an end of the first boom section 422, and a mating feature 425 is shown located on an end of the second boom section 424. In the embodiment, shown, the engaging feature 423 is designed to uniquely engage the mating feature 425. In one embodiment, a slot configuration is used to form an initial alignment between the engaging feature 423 and the mating feature 425 along direction 427. In one embodiment, a joint between the first section 422 and the second section 424 is further secured using one or more bolts after the engaging feature 423 and mating feature 425 have been joined. FIG. 4 also shows a third boom section 470 on a shelf 472. In one embodiment, the shelf 472 includes engaging features to hold and align one or more of the next boom sections and make adding boom sections to the boom length easier. By holding multiple boom sections, the shelf 472 increases the efficiency of extending or retracting a boom.

As shown in FIG. 4, in one embodiment, toothed racks are included in both the first section 422 and the second section 424 that line up after joining the two sections. A boom driver 432 is shown within a housing 430 that engages the boom sections. In the embodiment shown, the boom driver 432 includes a drive gear that engages a lateral side of the boom sections using a toothed rack. As discussed above, other lateral engaging methods such as frictional engagement, etc. are also within the scope of the invention.

In one embodiment, the boom driver 432 is actuated using a hydraulic motor or motors. In FIG. 4, a first gear 434 is coupled to at least one hydraulic motor to actuate the boom driver 432. Other actuators such as electric motors, internal combustion driven gears, etc. are within the scope of the invention.

FIG. 4 further illustrates a linkage system 428 coupled to an actuator 426 such as a hydraulic cylinder. In one embodiment, the housing 430 moves between an operation position and a storage position as described above through use of the linkage system 428 and the actuator 426. Although a hydraulic cylinder actuator 426 and a linkage system 428 are shown, the invention is not so limited. One of ordinary skill in the art, having the benefit of the present disclosure will recognize that alternative mechanisms can be used to move between an operation position and a storage position. The configuration shown in FIG. 4, however includes an advantage of being inexpensive to manufacture and simple to operate.

A pulley 450 is also shown in FIG. 4, similar to pulleys described in embodiments above. In one embodiment, the flexible line that is being pulled by the winch travels over the pulley 450 and is guided into a channel 429 of the boom section 422. Pulling forces are shown by arrow 461 directed along a long axis of the boom section 422. Using the configuration shown in FIG. 4, a flexible line transmits pulling forces to the boom in compression close to a central axis of the boom section 422. In contrast, if the flexible line is guided along side the boom section 422, the pulling forces increase the likelihood of buckling in the boom section 422.

A boom lock device 460 is further shown in FIG. 4. In one embodiment, the boom lock 460 includes a sliding portion 462 with a slot 464 located on one side. FIG. 4 shows a lever 466 coupled to the sliding portion 462 to actuate it back and forth for engagement or disengagement with the boom section 422. Although a lever 466 is shown, other actuating devices are within the scope of the invention, such as knobs, solenoids, hydraulic or electric actuators, etc. In one embodiment, at least one slot 464 or similar feature mates with one or more of a number of spaced structures 421 similar to spaced structures 318 described above. In one embodiment, the spaced structures include steel bars welded in place within a portion of the boom section 422. Although steel bars are shown, other spaced structures that are configured to engage one or more slots 464 are also within the scope of the invention. Examples include, but are not limited to protrusions or recesses formed into a boom section, other mechanical engaging features, etc. Advantages of the sliding portion 462 and slot 464 shown in FIG. 4 include inexpensive manufacture, and engagement of more than one spaced structures 421 at one time while actuated, giving higher strength than if only one spaced structure 421 were engaged.

Other advantages of configurations with a boom lock 460 include the ability to easily raise or lower a boom when the boom lock 460 is disengaged. Then, by engaging the boom lock 460, the boom is easily secured at a particular length, and pulling forces 461 are only transmitted to portions of the boom lock 460 in contrast to pulling forces 461 being transmitted to the boom driver 432 or other linkages within the housing 430.

Figure 5A:
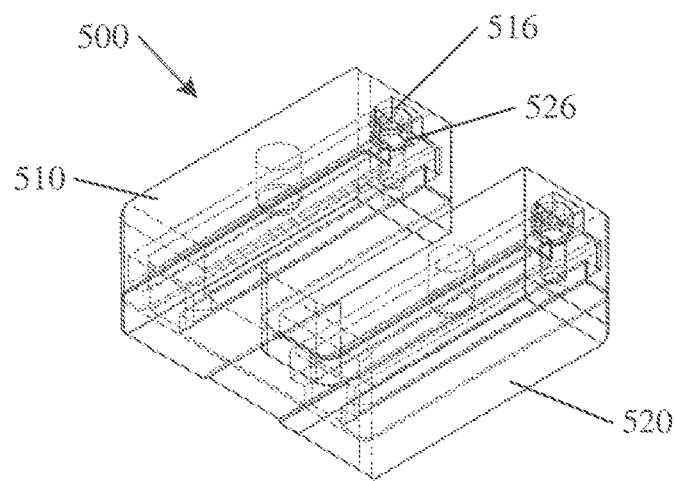
FIG. 5A shows an isometric view of a boom section joint according to an embodiment of the invention.
Figure 5B:
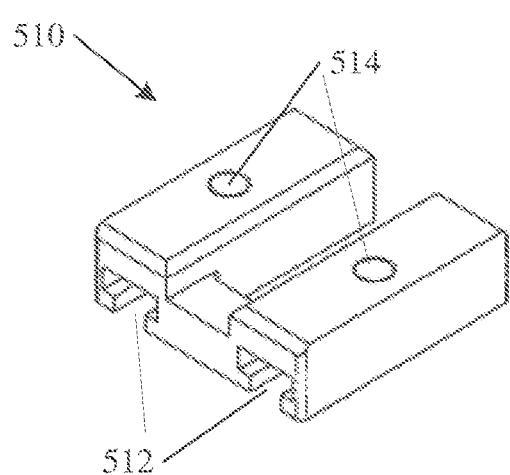
FIG. 5B shows an isometric view of a boom section joint component according to an embodiment of the invention.
Figure 5C:
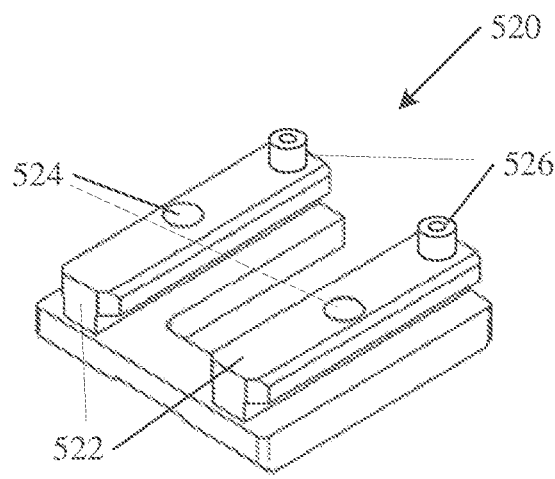
FIG. 5C shows an isometric view of a mating boom section joint component according to an embodiment of the invention.

FIGS. 5A-5C show various components and views of a joint assembly 500 between boom sections according to one embodiment of the invention. In FIG. 5A the joint assembly 500 includes an engaging unit 520 and a mating unit 510. In one embodiment, the mating unit 510 includes one or more slots 512, and the engaging unit 520 includes one or more tabs 522 that fit within the slots 512. In the embodiment shown, the tabs 522 of the engaging unit 520 slide laterally into the slots 512 of the mating unit 510.

A locating pocket 516 and corresponding locating protrusion 526 are shown in an assembled condition of the joint assembly 500. In one embodiment, the locating protrusions 526 include a pair of hex headed bolts, and the locating pockets 516 are machined to fit closely with the heads of the pair of hex headed bolts. In one embodiment, the locating pockets 516 and the locating protrusions 526 provide a reference for when the engaging unit 520 and mating unit 510 are in alignment.

As shown in FIG. 4, in one embodiment, boom sections are joined together laterally along direction 427 by sliding together a joint assembly such as joint assembly 500. In embodiments that utilize locating pockets 516 and locating protrusions 526, the boom sections are slid together until the protrusions 526 are stopped by the pockets 516. One advantage of this design includes the ability to assemble heavy boom sections without excessive attention to alignment of the joint assembly. In one embodiment, alignment of the joint assembly 500 also provides alignment between holes 514 and depressions 524 as described below.

FIG. 5B shows the mating unit 510 from FIG. 5A. A pair of threaded holes 514 are shown formed in the mating unit 510. FIG. 5C shows the engaging unit 520 from FIG. 5A. A pair of depressions 524 are shown formed in the engaging unit 520. The holes 514 in FIG. 5B pass through the thickness of the mating unit 510, while the depressions 524 only partially pass into a surface of the engaging unit 520. This can also be seen in dashed lines shown in FIG. 5A.

In one embodiment, once the engaging unit 520 and mating unit 510 are in alignment, a bolt or other fastening member is secured between the engaging unit 520 and the mating unit 510 to further prevent any unwanted separation of the joint assembly 500. In the embodiment shown in FIGS. 5A-5C, a pair of bolts (not shown) are threaded through the holes 514 of the mating unit 510, and ends of the bolts are seated within the depressions 524 of the engaging unit 520. When the bolts are tightened, they both secure the joint assembly 500 between the holes 514 and the depressions 524, and they force the mating unit 510 to tighten against the engaging unit 520, thus reducing any unwanted motion between boom sections, and increasing an amount of surface area contact within the joint assembly 500. In the embodiment shown, tightening bolts or other threaded members within the holes 514 and against the depressions 524 forces the engaging unit 520 and the mating unit 510 apart along a boom axis, yet the units 510, 520 are still held captive by the tabs 522 and slots 512 shown. As a result, the tabs 522 are pressed against the slots 512 to ensure solid contact within the joint assembly 500.

Figure 6:
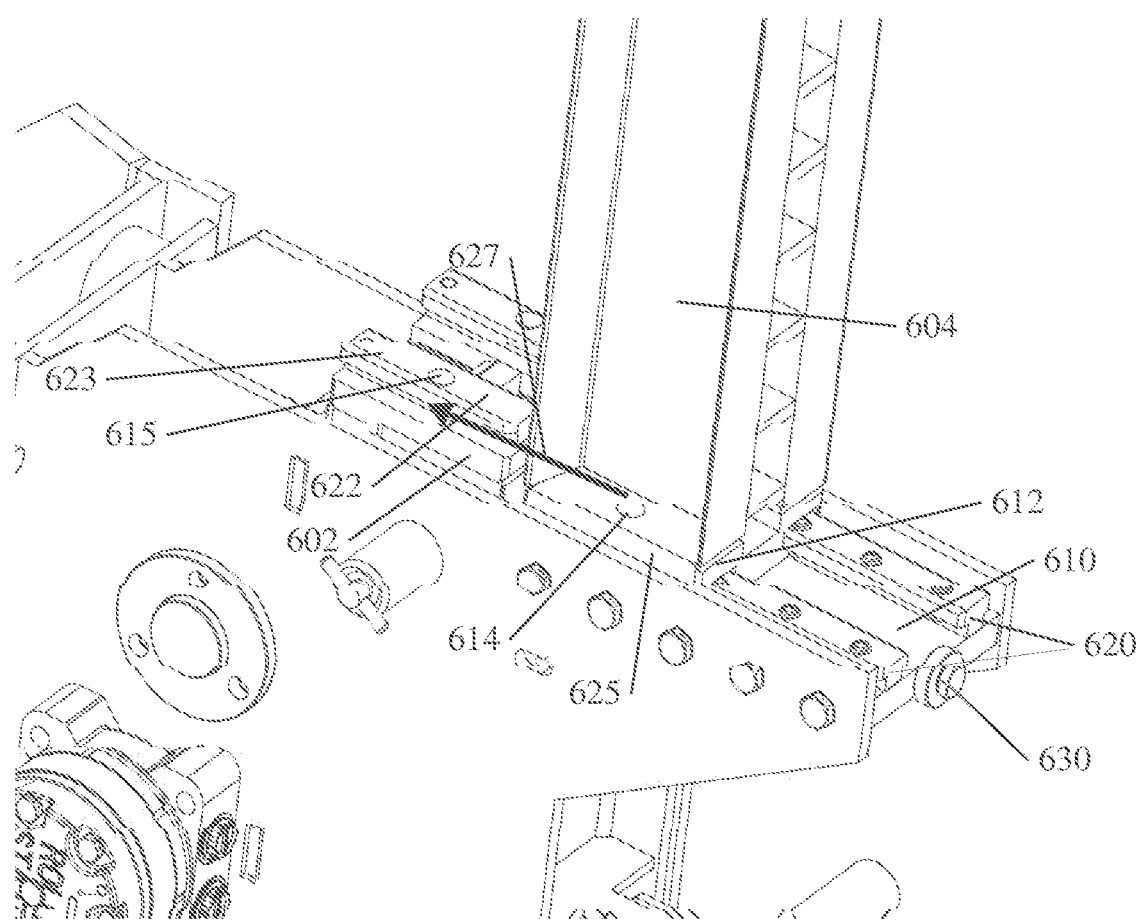
FIG. 6 shows an isometric view of a portion of a portable winch according to an embodiment of the invention.

FIG. 6 shows a close up view of an assembly operation of a pair of boom sections. A first boom section 602 is shown already in place within a boom, while a second boom section 604 is shown ready for joining with the first boom section 602 to add length to the boom. Similar to embodiments described above, an engaging feature 623 is shown located on an end of the first boom section 602, and a mating feature 625 is shown located on an end of the second boom section 604. In one embodiment, the mating feature 625 includes one or more slots 612, and the engaging feature 623 includes one or more tabs 622 that fit within the slots 612.

In one embodiment, a shelf 610 is attached to the boom assembly, to aid in alignment and attachment of the joint between the first boom section 602 and the second boom section 604. In one embodiment, one or more shelf tabs 620 are attached to the shelf 610 in a configuration that substantially matches the tabs 622 on adjacent boom sections. In one method of operation, the second boom section 604 is first mated with the shelf tabs 620 using the slots 612 of the mating feature 625. This positions the second boom section 604 to be ready for joining to the first boom section 602 when the engaging feature 623 of the first boom section 602 is at the right height. When the mating feature 625 and the engaging feature 623 are aligned, the second boom section 604 is slid into place along direction 627.

As described in discussion of FIGS. 5A-5C, in one embodiment, a bolt or other fastener is then threaded or otherwise inserted into hole 614 and seated against depression 615. The bolt or other fastener (not shown) can serve a number of functions. In one embodiment the insertion in to hole 614 and into depression 615 further secures the joint between the first boom section 602 and the second boom section 604. In one embodiment, the insertion in to hole 614 and into depression 615 provides an aligning function to ensure that the first boom section 602 and the second boom section 604 are centered over each other. In one embodiment, the insertion in to hole 614 and into depression 615 presses portions of the engaging feature 623 against portions of the mating feature 625 to increase an amount of surface area in contact at the joint. High surface area contact is desirable because it increases the stiffness of the joints within a multiple section boom.

In one embodiment, a retaining feature 630 is included to keep the second boom section 604 in place on the shelf 610 before a boom section joining operation. In one method, the retaining feature 630 is first removed in order to place the next boom section on the shelf tabs 620. The retaining feature 630 is then replaced to retain the boom section on the shelf 610 until the boom section is secured onto the boom.

Figure 7:
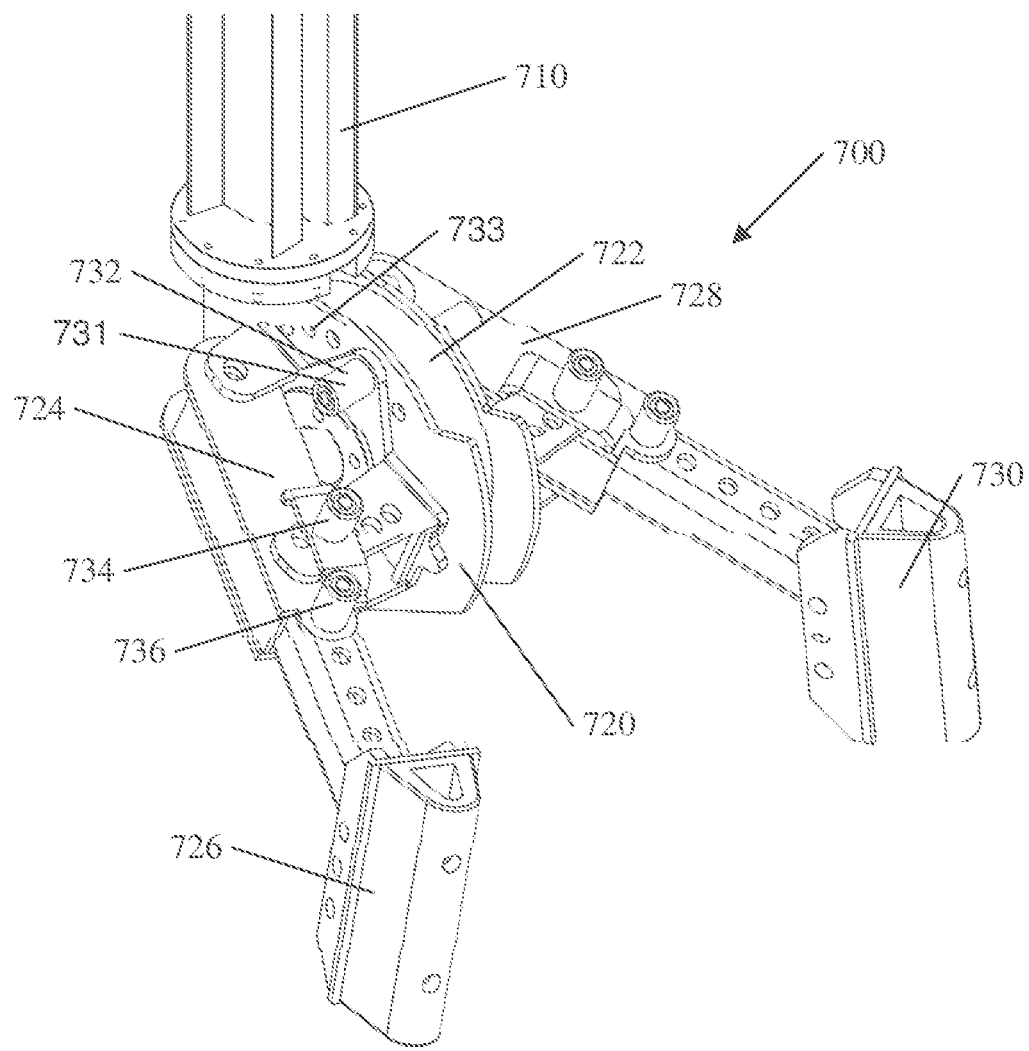
FIG. 7 shows an isometric view of a boom end portion of a portable winch according to an embodiment of the invention.

FIG. 7 shows a boom end portion 700 according to one embodiment. A boom section 710 is included to attach to other boom sections as described in embodiments above. An end unit body 720 is shown coupled to the boom section 710, with a pulley 722 to redirect a flexible line such as wire rope, etc. A first support strut 724 and a second support strut 728 are shown in FIG. 7. Although two support struts are shown, other embodiments may include one or more than two support struts. A first bumper 726 is shown coupled to the first support strut 724, and a second bumper 730 is shown coupled to the second support strut 728. In one embodiment, the addition of bumpers serves to reduce slippage of the support struts and/or to reduce damage to an adjacent surface such as a manhole.

A number of strut adjustments are shown in FIG. 7. In the example shown, both the first support strut 724 and the second support strut 728 include multiple adjustment possibilities. For simplicity in discussion, only the adjustments to the first support strut 724 are detailed. A pitch adjustment 732 is shown, and a yaw adjustment 734 is shown. An extension adjustment 736 is also included in the configuration of FIG. 7. In one embodiment, a number of spring loaded pins are used in combination with a series of drilled holes to facilitate adjustments. In operation, to make an adjustment, a collar portion 731 is pulled to pull back a pin (not shown) from within one of the holes 733. When released, the pin and collar 731 are biased to normally seat the pin within one of the holes 731. An advantage of spring loaded pins, includes the security and mechanical robustness of a pin in hole adjustment, combined with convenience of a pin that will not get lost or dropped during an adjustment.

Figure 8:
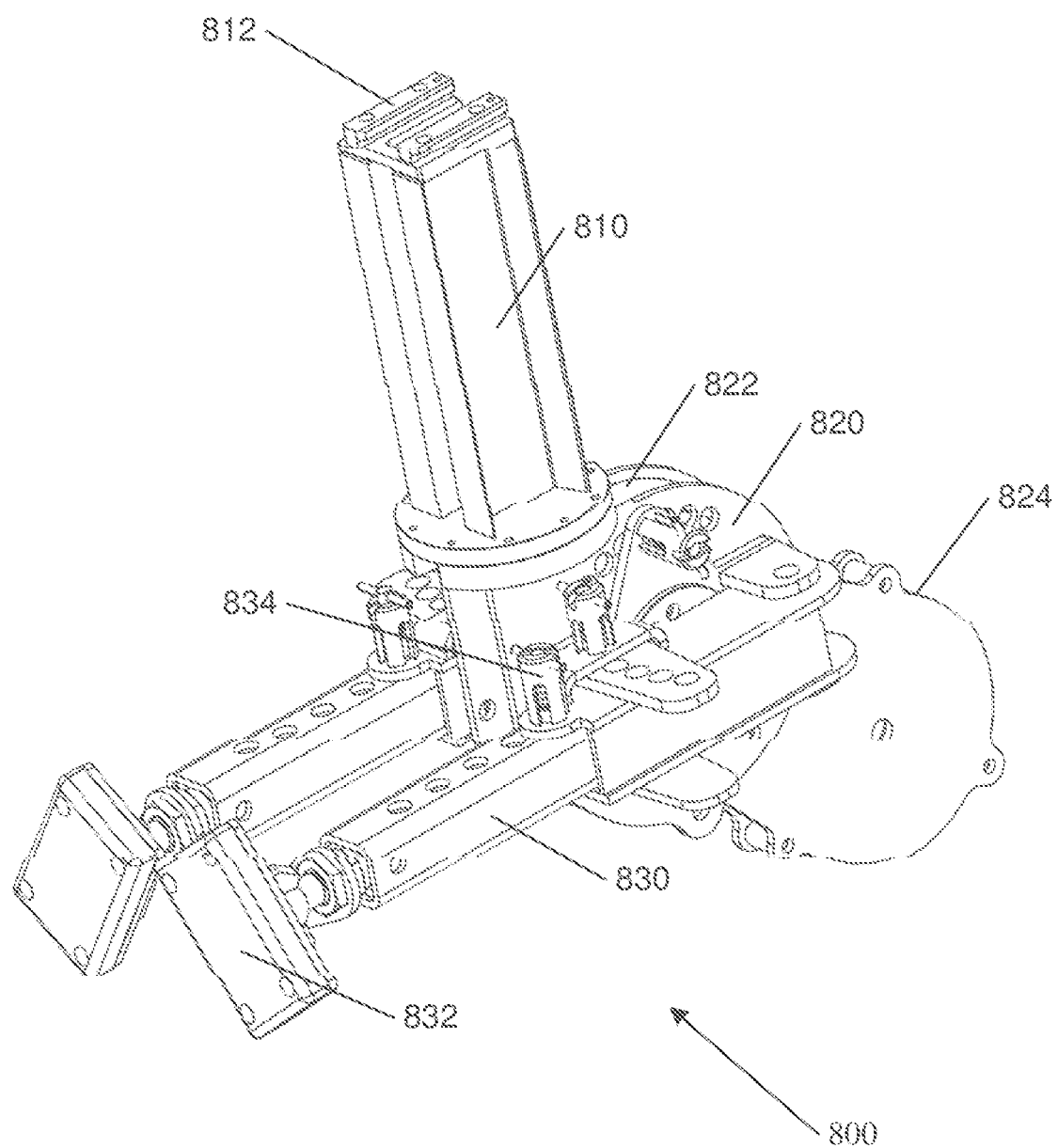
FIG. 8 shows an isometric view of another boom end portion of a portable winch according to an embodiment of the invention.

FIG. 8 shows another boom end portion 800. A boom section 810 is included to attach to other boom sections as described in embodiments above. An end unit body 820 is shown coupled to the boom section 810 including component to redirect a flexible line such as wire rope, etc. A first pulley 824 and second pulley 824 are shown in FIG. 8. Similar to embodiments shown above, one or more support struts 830 are included, with bumpers 832 coupled to their distal ends. In one embodiment, an orientation and a length of the support struts are adjustable as shown in more detail below. One adjustment device includes a spring pin assembly 834 which is also discussed in more detail below. In one embodiment, ball and socket joints are provided between an end of the strut 830 and bumpers 832. Ball and socket joints improve force distribution to irregular wall surfaces during a pulling operation.

Figure 9:
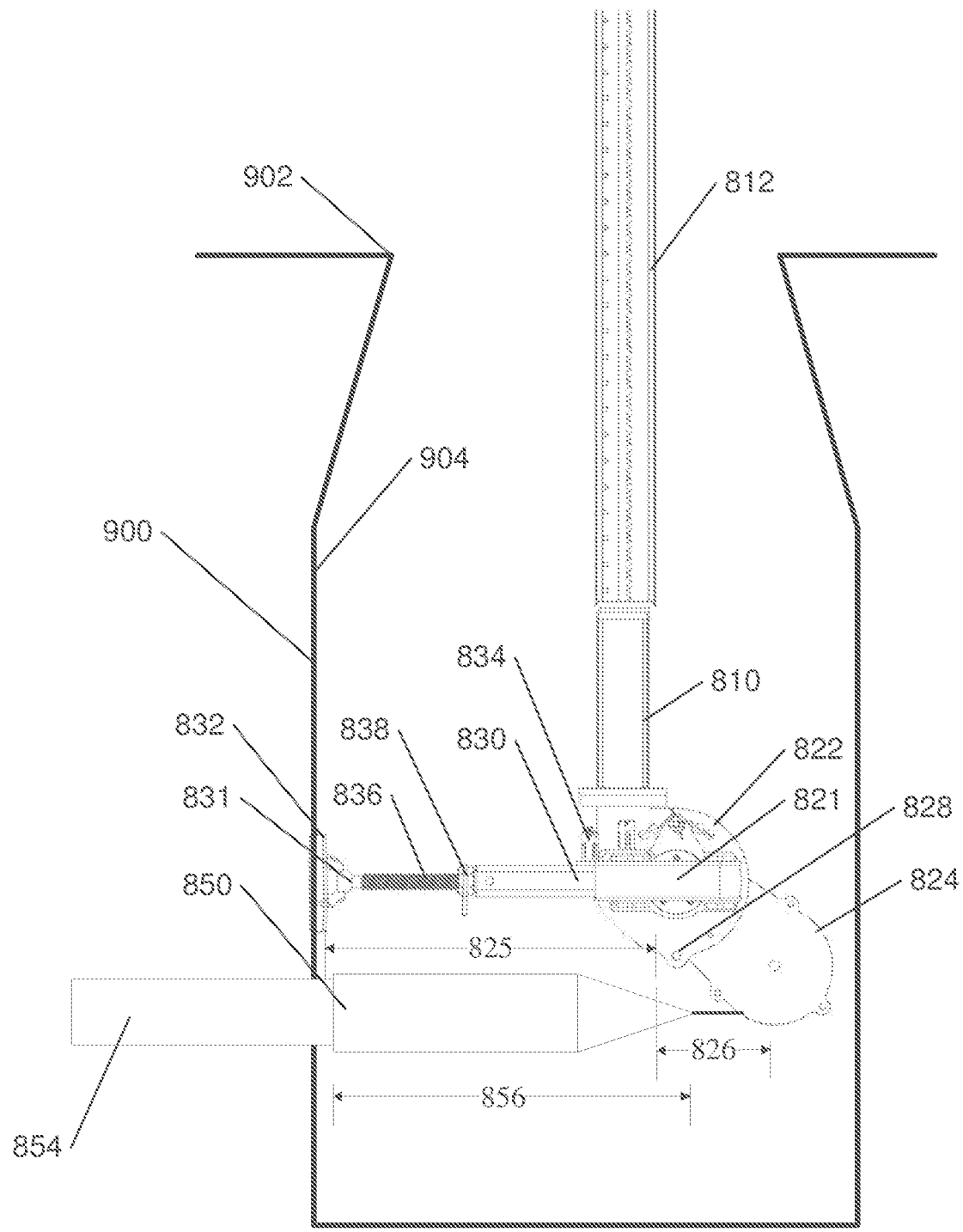
FIG. 9 shows a side view of a deployed boom according to an embodiment of the invention.

FIG. 9 shows a the boom end portion 800 connected to another boom section 812. FIG. 9 shows the boom end portion 800 deployed in a bursting operation within a manhole 900 as an example. The example manhole 900 includes a narrow top portion 902 and a larger diameter lower portion 904 where bursting typically takes place. A threaded portion 836 is shown extending from the strut 830 to brace against the wall of the manhole 900. One embodiment includes the threaded portion 836 for length adjustment with respect to the strut 830. The embodiment shown in FIG. 9 includes a corresponding threaded adjuster 838 with a handle to quickly adjust the length of the threaded portion exposed from an end of the strut 830. In selected embodiments, as shown in FIG. 9, a spring pin assembly 834 is further included for rough length adjustment. The combination of the spring pin assembly 834 adjustment with the threaded portion 836 adjustment provides fast adjustability over both coarse ranges of motion and fine tuning using the threaded member 836.

The bumper 832 is shown in contact with the wall of the manhole. In one embodiment, the bumper 832 is coupled to the threaded portion 836 with a ball and socket joint 831. An advantage of using a ball and socket joint includes the ability to conform to difficult wall conditions within the manhole 900 that are sometimes encountered in bursting operations.

When only a single pulley boom end unit configuration is used there is a limit on horizontal space within the manhole 900. As shown in FIG. 9, there is only a given amount of space 825 between the wall of the manhole 904 and the edge of the first pulley 822. When a burster 850 is pulled into the manhole 900, a length 856 of the burster 850 determines how easily the burster 850 can be removed from the attached new pipe 856 to finish the bursting and new pipe installation.

In a single pulley boom end configuration, it is easiest to remove the burster 850 if the burster length 856 is shorter than the space 825. In many situations, the space 825 is not large enough, or the space 825 leaves little room to maneuver. If the burster 850 is pulled tight up against the pulley, the boom end portion, or the burster can be damaged.

According to an embodiment of the invention, a second pulley 824 is included as shown in FIG. 9. One advantage of using a second pulley 824 is the ability to offset the first pulley 822 and the second pulley 824 by a distance 826. The extra distance 826 is then available to better allow the burster 850 to fully enter the manhole 900. The extra distance 826 also provides an additional margin of room to avoid damage to the boom end unit 800 or the burster 850 resulting from pulling the burster 850 too close.

In one embodiment, a rotating joint 821 is included to allow relative motion between the first pulley 822 and the second pulley 824. A securing feature 828 is included to inhibit relative motion between the pulleys 822, 824 during a bursting operation. In one embodiment as shown in FIG. 9, the securing feature includes a bolt passing through a hole to inhibit relative rotation between the pulleys, although the invention is not so limited. Other securing features may include a ratchet, spring pin, latch, etc. A feature provided by the rotating joint 821 is further illustrated in FIG. 10.

Figure 10:
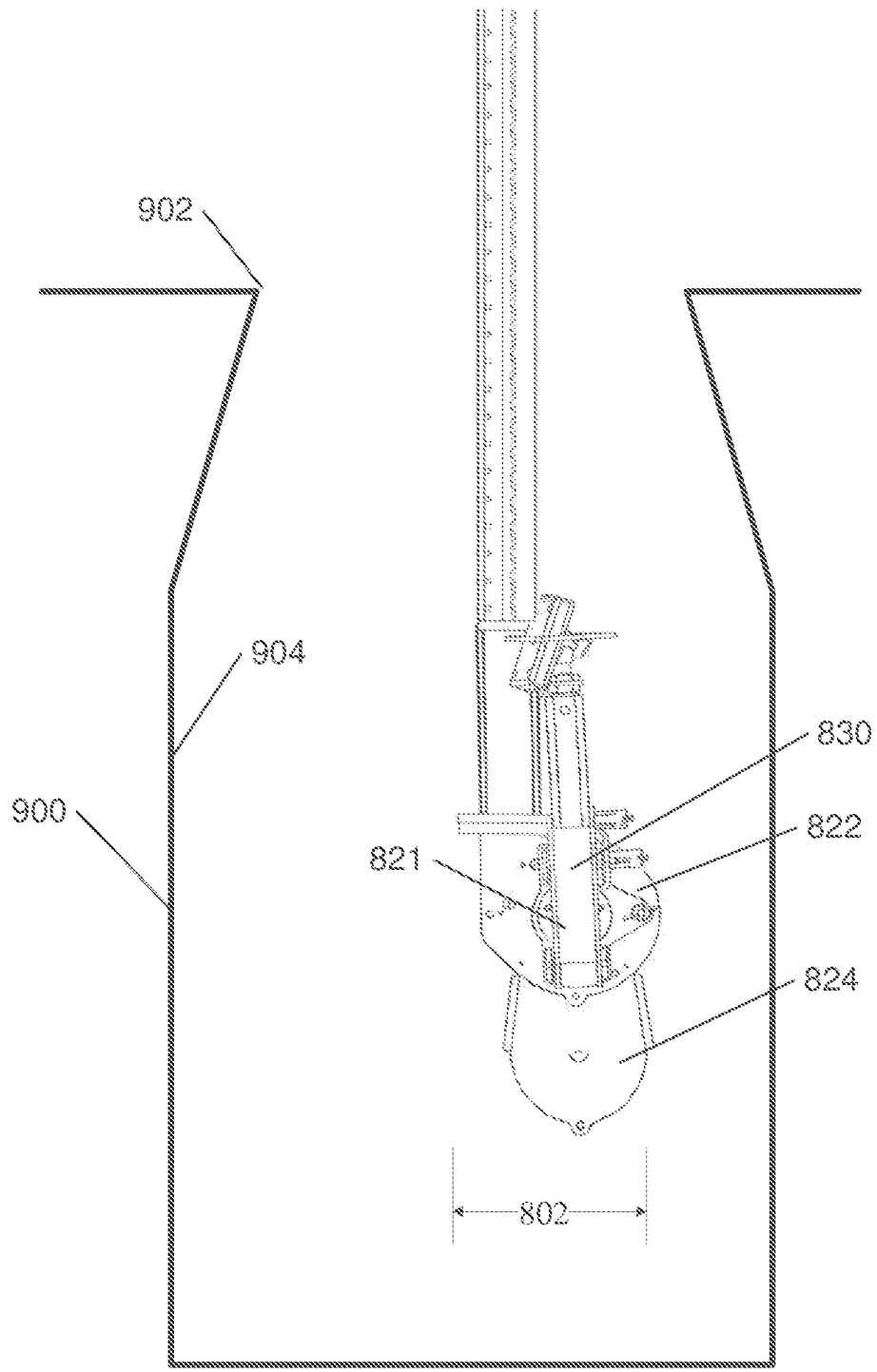
FIG. 10 shows a side view of a boom in an intermediate state according to an embodiment of the invention.

The boom end unit shown in FIG. 10 illustrates one configuration to be used for inserting or removing the boom end unit 800. As illustrated, frequently an entry diameter such as 902 is smaller that a diameter at a location 904 where the boom end unit will operate. In one embodiment, the boom end unit 800 is changeable between a bursting operation configuration, and an insertion or removal configuration. One example of an insertion or removal configuration is shown in FIG. 10. A boom end unit cross section dimension 802 is shown to illustrate an increased ability to insert or remove the boom end unit through narrow openings when in the configuration shown. In one example, the second pulley 824 rotates with respect to the first pulley 822. The configuration shown in FIG. 10 additionally shows the strut 830 rotating with respect to the first pulley 822. In one embodiment, spring pins or other fasteners hold components of the boom end unit in a configuration for insertion or removal. In one embodiment, selected component such as the second pulley 824 are not locked. For example the second pulley 824 can rotate freely with respect to the first pulley 822 about the joint 821 in one configuration.

Figure 11:
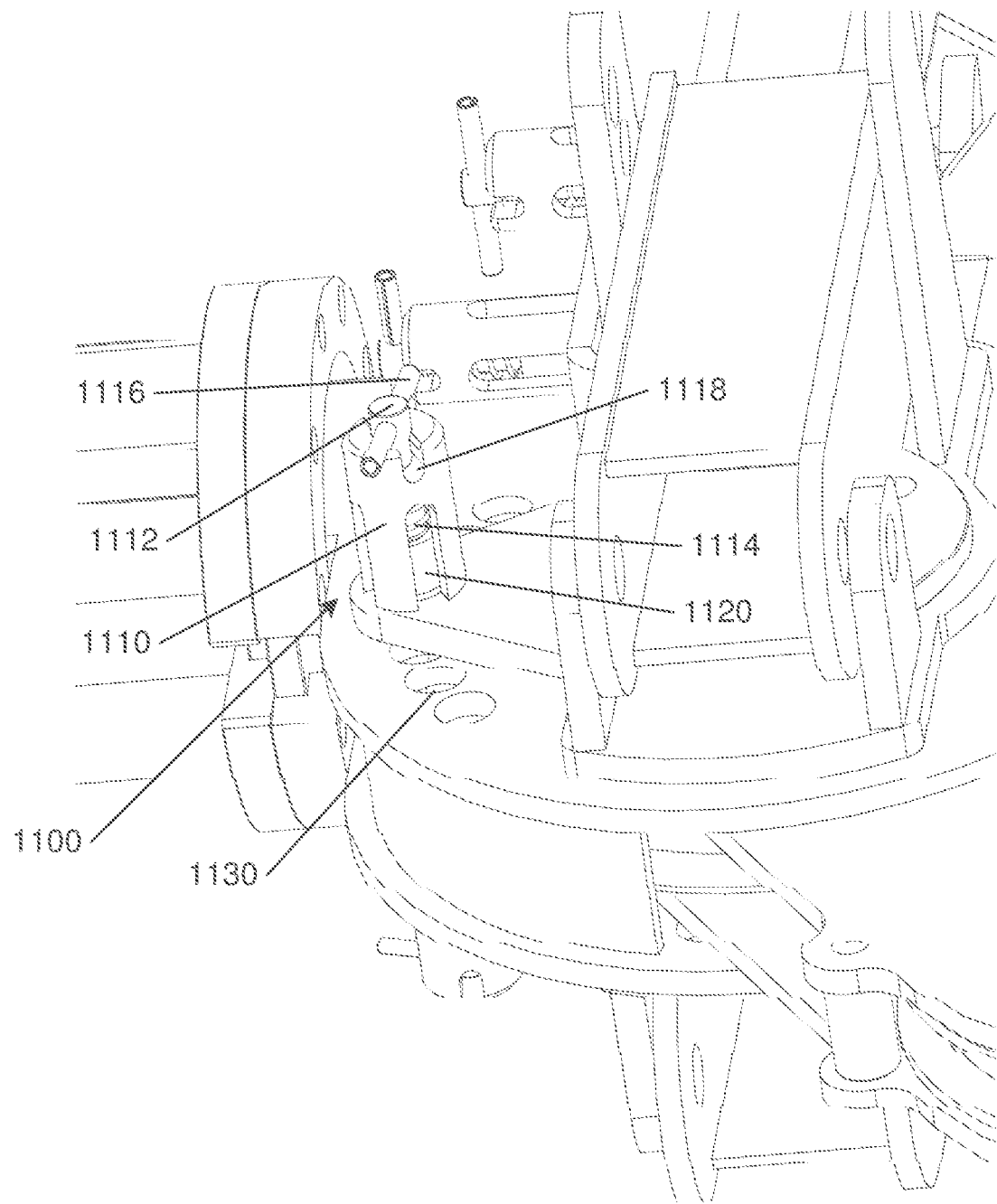
FIG. 11 shows a close up isometric view of a boom component according to an embodiment of the invention.

FIG. 11 shows a close up view of one type of fastener for use with embodiments of the invention as described in the present disclosure. One type of fastener discussed in configurations above includes a spring pin 1100. The spring pin 1100 shown in FIG. 11 includes a fixed portion 1110 with a pin 1112 that is movable with respect to the fixed portion 1110. A "T" handle 1116 is shown in the example, coupled to the pin 1112. A spring 1114 is included to bias the pin 1112 to a normally down position within at least one hole 1130. A slot 1118 is included in the example of FIG. 11 that substantially matches the handle 1116 to provide a down position of the pin 1112 when the handle 1116 is within the slot 1118.

In one method of operation, the pin 1112 is pulled up against spring tension, and rotated to sit outside the slot 1118 as shown in FIG. 11, when it is desired to unlock the joint. With the handle 116 resting on top of the fixed portion 1110, outside the slot 1118, the pin is not engaged with any holes 1130, and the joint can be maneuvered with both hands.

To engage the fastener 1100, the handle 1116 is rotated to line up with the slot 1118, and the spring 1114 biases the pin 1112 down into engagement with a hole 1130. Adjustment of the joint is easier with this configuration, because the user does not have to hold the pin against the biasing spring 1114 while adjusting is being done, while at the same time a simple twist of the handle 1116 returns the biases pin 1112 into engagement.

In one embodiment, one or more openings 1120 are cut into a side of the fixed portion 1110. This configuration allows dirt or other debris often found on job sites to move out of the fixed portion 1110, and clear of the pin 1112 and hole 1130 during a joint adjustment. This configuration provides one level of improvement over closed designs that may jam due to the presence of dirt, etc.

FIG. 12 shows one possible method of operation of a winch according to one embodiment. A boom driver is actuated against a lateral surface of a boom section to lower the boom section into a hole such as an exit pit. A pulley located at a distal end of the boom section is positioned near a pipe to be replaced, an end of which is exposed within the exit pit. A flexible line such as a wire rope is then fed through the pipe to be replaced and into an entry pit. A pipe burster such as a pipe expander, a ductile material cutter, etc. is then secured to the wire rope in the entry pit. A new pipe such as flexible polyethylene pipe is then secured to a back end of the pipe burster. When the winch is operated, the pipe burster is pulled through the old pipe, bursting it as it is pulled. The new pipe is pulled into place as the burster advances through the soil.

Embodiments of portable winches and methods of use as described above have a number of advantages. One advantage includes an ability to lower a boom or boom sections into limited access exit pit for winching operations such as pipe bursting. Particular boom sectional designs provided in embodiments described above provide the ability to easily raise and lower a boom large distances without the need for a single long boom. A sectional boom design allows for easy replacement of only a single section if one happened to be damaged. A boom driver that drives the boom through mechanical or frictional interaction in both an upward and a downward direction is useful in contrast to a gravity lowered configuration. A gravity lowered configuration may have problems lowering in some situations due to fouling of the boom with dirt. Selected embodiments further include flexible inserts between the boom and the winch frame that help resist damage from unforeseen shifting of the device during operation.

While a number of advantages of embodiments of the invention are described, the above lists are not intended to be exhaustive. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and methods are used. The scope of the invention should be determined with reference to the appended claims, along with the full scope of equivalents to which such claims are entitled.

What is claimed is:

1. A portable winch, comprising:
 a winch;
 a boom including one or more boom sections;
 one or more elastomeric inserts coupled between the boom and the winch, wherein the elastomeric inserts provide a limited range of motion between the boom and the winch;
 a top pulley positioned at a top of the boom;
 a flexible line coupled to the winch; and
 a boom end unit, including an end unit pulley.

2. The portable winch of claim 1, wherein the top pulley is fixed to the boom.

3. The portable winch of claim 1, wherein the boom is bolted to the winch with a number of bolts, and the one or more elastomeric inserts surround one or more of the bolts.

4. The portable winch of claim 3, wherein the one or more elastomeric inserts includes 10 elastomeric inserts.

5. The portable winch of claim 1, further including a pair of pulleys on the boom end unit, wherein the pair of pulleys are adjustable in orientation with respect to each other.

6. The portable winch of claim 5, wherein the pair of pulleys includes a first pulley and a second pulley, and wherein a joint between the first pulley and the second pulley is located at a center of the first pulley.

7. The portable winch of claim 6, further including a plurality of holes to select a position of the joint; and
 a spring pin assembly to engage one of the holes, the spring pin assembly having selectable pin positions, including:
 an engaged position of the pin, wherein the engaged position is normally biased by a spring into one of the holes;
 a disengaged position of the pin, where the pin is held out of the holes, against the bias of the spring in a hands free configuration; and
 one or more openings to permit flushing of debris from within the spring pin assembly.

8. A method, comprising:
 orienting two pulleys at an end unit of a boom in a first orientation such that the two pulleys have a first lateral cross section;
 lowering the end unit of the boom into a first ground opening;
 orienting the two pulleys at the end of the boom within the first ground opening in a second orientation such that the two pulley have a second lateral cross section wider than the first lateral orientation;
 pulling a tool through a pipe to be replaced from a second ground opening into the first ground opening using a cable that passes over the two pulleys at the end unit.

9. The method of claim 8, wherein orienting the two pulleys at the end of the boom includes orienting a joint between the two pulleys, wherein the joint is located at a center of one of the two pulleys.

10. The method of claim 8, further including fixing an orientation between the two pulleys by inserting a pin in a chosen hole of an array of holes.

11. The method of claim 8, wherein pulling a tool through a pipe to be replaced includes pulling a pipe bursting tool.

12. The method of claim 8, wherein lowering the end unit of the boom into a first ground opening includes lowering the end unit into a first manhole.

13. The method of claim 8, wherein lowering the end unit into a first manhole includes lowering past a narrow top portion of the manhole into a wider lower portion of the manhole.

14. The method of claim 8, wherein pulling a tool through a pipe to be replaced from a second ground opening into the first ground opening includes pulling the tool from a second manhole to a first manhole.

* * * * *